United States Patent
Baehrle-Miller et al.

(10) Patent No.: US 9,441,689 B2
(45) Date of Patent: Sep. 13, 2016

(54) METHOD FOR ADJUSTING A PARKING BRAKE IN A VEHICLE

(75) Inventors: Frank Baehrle-Miller, Schoenaich (DE); Tobias Putzer, Bad Friedrichshall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 14/007,062

(22) PCT Filed: Jan. 26, 2012

(86) PCT No.: PCT/EP2012/051182
§ 371 (c)(1),
(2), (4) Date: Dec. 5, 2013

(87) PCT Pub. No.: WO2012/130494
PCT Pub. Date: Oct. 4, 2012

(65) Prior Publication Data
US 2014/0076674 A1    Mar. 20, 2014

(30) Foreign Application Priority Data

Mar. 25, 2011   (DE) .................. 10 2011 006 120

(51) Int. Cl.
| | | |
|---|---|---|
| F16D 65/18 | (2006.01) | |
| B60T 13/58 | (2006.01) | |
| B60T 13/66 | (2006.01) | |
| B60T 13/74 | (2006.01) | |

(52) U.S. Cl.
CPC .............. *F16D 65/18* (2013.01); *B60T 13/588* (2013.01); *B60T 13/662* (2013.01); *B60T 13/741* (2013.01)

(58) Field of Classification Search
CPC .... F16D 65/18; B60T 13/588; B60T 13/662; B60T 13/741
USPC .............. 188/159, 105, 106 P, 265, 158, 162
See application file for complete search history.

(56) References Cited

U.S. PATENT DOCUMENTS

| | | | | |
|---|---|---|---|---|
| 7,227,324 | B2 * | 6/2007 | Erben et al. .................. | 318/430 |
| 7,370,735 | B2 * | 5/2008 | Gilles et al. ................. | 188/72.7 |
| 7,721,853 | B2 * | 5/2010 | Chittka ........................ | 188/72.8 |
| 8,177,040 | B2 * | 5/2012 | Matsushita et al. .......... | 188/162 |
| 8,844,683 | B2 * | 9/2014 | Sternal et al. ............... | 188/72.6 |
| 2004/0238299 | A1 | 12/2004 | Ralea et al. | |
| 2005/0109568 | A1 * | 5/2005 | Ether ............................ | 188/156 |
| 2005/0167212 | A1 | 8/2005 | Pascucci et al. | |
| 2006/0131113 | A1 * | 6/2006 | Christof .................. | B60T 7/045 188/72.1 |
| 2010/0193302 | A1 * | 8/2010 | Schumann et al. ........... | 188/105 |
| 2012/0205202 | A1 * | 8/2012 | Baehrle-Miller et al. ......................... | 188/106 P |
| 2013/0056315 | A1 * | 3/2013 | Bieltz et al. .............. | 188/106 P |

FOREIGN PATENT DOCUMENTS

| | | |
|---|---|---|
| CN | 1646823 A | 7/2005 |
| CN | 101821141 A | 9/2010 |
| DE | 19858763 | 6/2000 |
| DE | 10361042 | 5/2005 |
| DE | 10356096 | 6/2005 |
| DE | 102007046953 | 4/2009 |
| FR | 2847629 | 5/2004 |
| FR | 2906209 | 3/2008 |
| FR | 2941757 | 8/2010 |
| WO | WO 2010097938 A1 * | 9/2010 |

OTHER PUBLICATIONS

International Search Report for PCT/EP2012/051182, issued on Aug. 27, 2012.

* cited by examiner

*Primary Examiner* — Melanie Torres Williams
(74) *Attorney, Agent, or Firm* — Norton Rose Fulbright US LLP

(57) ABSTRACT

In a method for adjusting a parking brake, which includes an electromechanical braking device having an electric brake motor, the brake motor is braked upon reaching an end position.

19 Claims, 2 Drawing Sheets

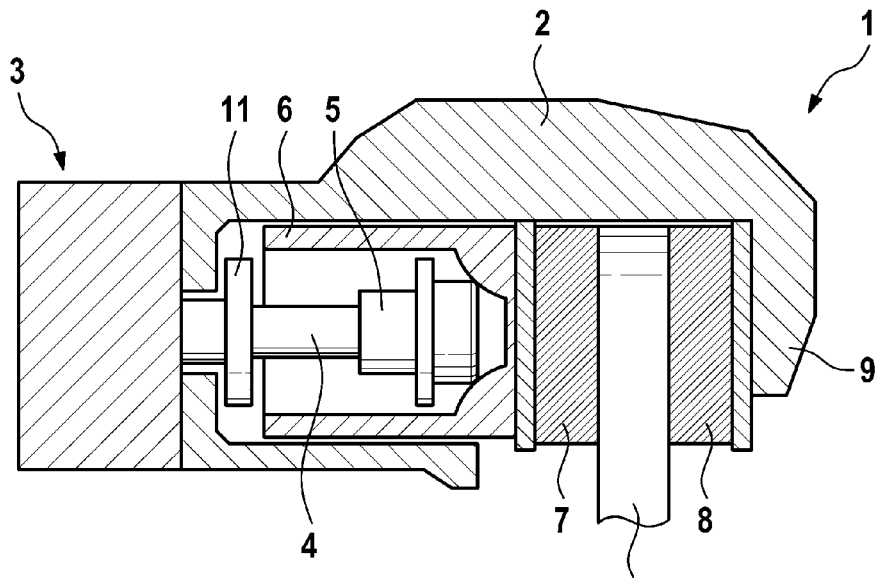
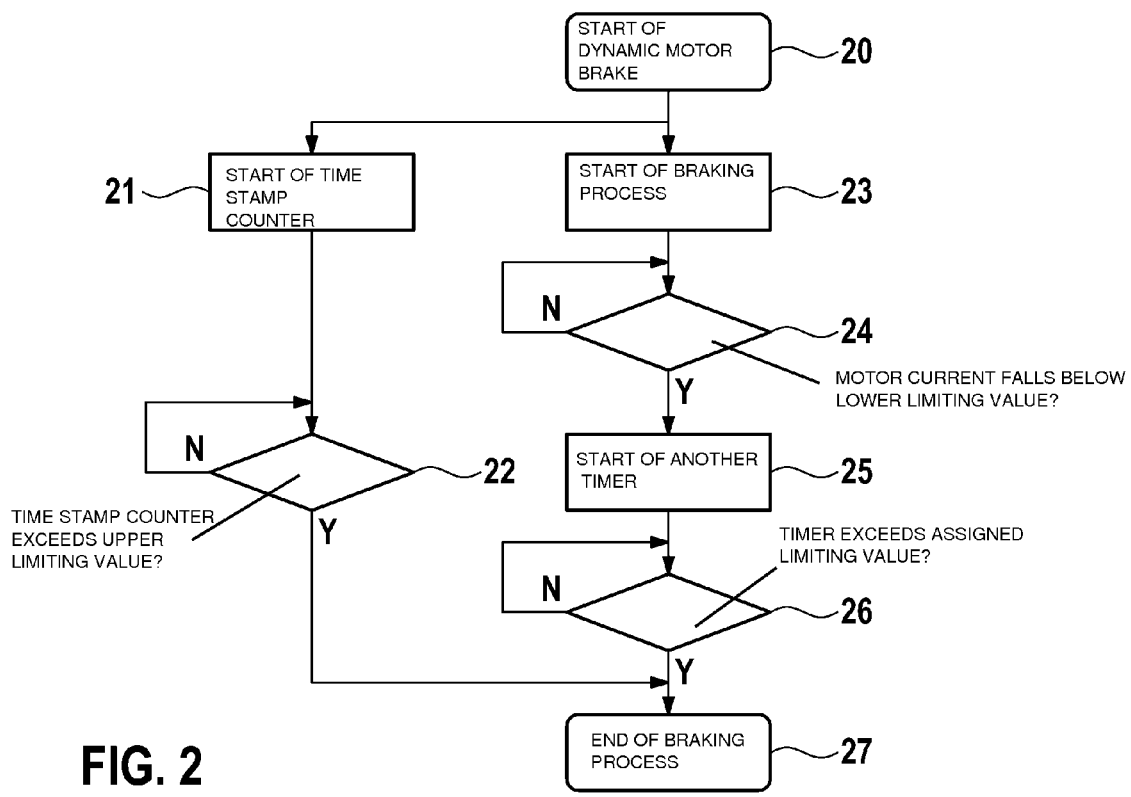

METHOD FOR ADJUSTING A PARKING BRAKE IN A VEHICLE

CROSS REFERENCE TO RELATED APPLICATION

The present application is the national stage entry of International Patent Application No. PCT/EP2012/051182, filed on Jan. 26, 2012, which claims priority to Application No. DE 10 2011 006 120.7, filed in the Federal Republic of Germany on Mar. 25, 2011.

FIELD OF INVENTION

The present invention relates to a method for adjusting a parking brake in a vehicle.

BACKGROUND INFORMATION

Parking brakes in vehicles are known for generating a clamping force in order to set the vehicle at standstill. German Application No. DE 103 61 042 describes a parking brake having an electromechanical design that includes an electric brake motor which drives a brake piston to act axially by way of a brake pad against a brake disk. Upon application of the brake, the electric brake motor is actuated until a desired clamping force is reached. To release the parking brake, the brake motor is driven in the opposite direction and actuated until the brake pad no longer rests against the brake disk, and the clamping force is completely removed.

SUMMARY

It is an object of the present invention to employ simple measures to efficiently configure the brake application and release process for an electromechanical parking brake.

The method according to the present invention may be applied to an electromechanical parking brake in a vehicle that includes an electric brake motor via which a clamping force may be generated. In this case, the rotary motion of the rotor of the electric brake motor is translated into an axial positioning movement of a control element via which a brake piston that bears a brake pad is pressed axially against a brake disk.

The parking brake is optionally provided with an auxiliary braking device for providing a supplementary clamping force as needed and in addition to the electromechanical clamping force. The supplementary braking device is, in particular, a hydraulic braking device, preferably the hydraulic vehicle brake of the vehicle, the hydraulic pressure of the braking device acting on the brake piston.

To generate a clamping force, the brake motor is actuated during the brake application process until a first end position is reached that corresponds to a clamping force position in which the desired clamping force level is reached. To release the parking brake, the electric brake motor is actuated in the opposite direction until a second end position is reached that corresponds to the release position where the clamping force drops below a defined level, in particular equals zero.

In the method according to the present invention, the electric brake motor is braked upon reaching an end position. This may occur both upon reaching the clamping force position, as well as upon reaching the release position. In contrast to related-art design variations, the electric brake motor is actively braked upon reaching the end position in question, thereby avoiding any inertia-induced overshooting beyond the desired end position. This results in a shortening of the braking, respectively release process, as well as of the positioning travel covered and, moreover, in a reduction of the component loads during the brake application process since the clamping force position is reached with greater accuracy, respectively exactly, thereby avoiding a brake application beyond the desired clamping force level. Besides reducing the mechanical load on the components, the control electronics of the brake motor is also relieved of the load thereon, particularly during a braking process when the brake motor is immediately driven in the release direction again. This may occur, for example, when it is necessary to interrupt an already begun locking or braking process in response to detection of the driver's driveaway input.

Overall, therefore, the motor braking function makes it possible to reduce the excess force applied during the brake application process, thereby reducing the load on the components. Moreover, the brake application time is reduced by the braking. The same is true of the release, respectively opening process. Moreover, the subjectively experienced comfort is improved since, following actuation of the parking brake, the function call is immediately followed by operational readiness. Moreover, the loading of the regulating, respectively control, device of the brake motor is reduced. It is also advantageous that the method may be implemented without the need for additional hardware components.

The braking process is advantageously carried out by an electric braking of the brake motor. The braking process is effectively accomplished solely by electrical means. Basically, however, mechanical braking processes are also possible, additionally or alternatively, for example, in that upon reaching of an end position, a component moved by the brake motor is additionally braked by friction.

In the case of an electric braking, the braking process is achieved, in particular in that the brake motor is short-circuited. In the case of this dynamic braking of the motor, given short-circuited motor terminals, a current flows across the motor's internal resistance, as long as the rotor is moving. The braking torque generated in this case is in proportion to the motor speed and to the change over time of the current flowing in the short-circuited state, so that, at a higher motor speed, the motor braking torque is greater than at a lower motor speed. The motor braking torque may be utilized to decelerate the rotor, respectively motor armature, until the motor is at standstill.

The beginning of the braking process advantageously coincides with the reaching of the end position, so that the braking is first begun after the end position has been reached. Basically, however, the braking process may be begun already upon approaching of the end position, so that the motor is at a standstill upon the reaching of the end position.

The duration of the braking process may either be variably or permanently set. When the braking duration is variably defined, this corresponds, in particular, to a motor-related state variable, for example, to the motor current or motor speed, the braking process continuing until the motor current, respectively the motor speed, falls below an assigned limiting value. The limiting value for the motor current may in some instances be set to the value zero or, in accordance with an advantageous embodiment, to a higher value to provide greater resistance to interference, respectively the measured value noise, of the measured current signal. For example, the limiting value for the current may reside at 20% of the no-load current. The limiting value for the motor speed may also either be set to zero or to a value unequal to zero.

In the case of a braking process, which is carried out for a defined braking period, the value of the braking period is selected to be great enough to enable the brake motor to be braked from the highest possible speed down to a standstill. The braking period is 200 ms, for example.

The method according to the present invention is carried out in a regulating, respectively control, device in the vehicle that may be a component of the parking brake system.

Further advantages and useful exemplary embodiments are described in the following with reference to the accompanying drawings.

BRIEF DESCRIPTION OF THE DRAWINGS

FIG. 1 shows a section through an electromechanical parking brake for a vehicle where the clamping force is generated via an electric braking motor.

FIG. 2 shows a flow chart including method steps for electrically braking the brake motor, the braking period being determined from the motor current.

DETAILED DESCRIPTION

Figure 3:
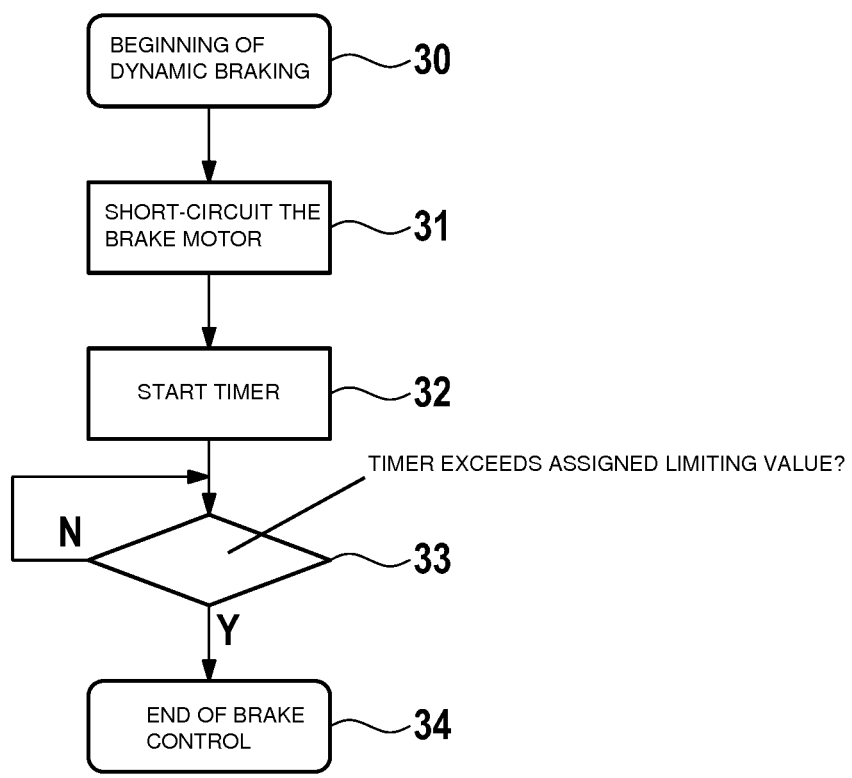
FIG. 3 shows a flow chart including method steps for electrically braking the brake motor, the braking period being specified as a constant time period.

FIG. 1 shows an electromechanical parking brake 1 for setting a vehicle at standstill. Parking brake 1 includes a caliper assembly 2 having a caliper 9 which reaches over a brake disk 10. As actuator, parking brake 1 has an electromotor as a brake motor 3 which rotationally drives a spindle 4 upon which a spindle component 5 designed as a spindle nut is rotationally mounted. In response to a rotation of spindle 4, spindle component 5 is axially adjusted. Spindle component 5 moves within a brake piston 6 which bears a brake pad 7 that is pressed by brake piston 6 against brake disk 10. Located on the opposite side of brake disk 10 is another brake pad 8 which is held immovably in place on caliper 9.

Within brake piston 6, spindle component 5 may move axially forwards toward brake disk 10, respectively, in response to an opposite rotational movement of spindle 4, axially rearwards until reaching a limit stop 11. To generate a clamping force, spindle component 5 acts upon the inner end face of brake piston 6, whereby brake piston 6, which is supported axially displaceably in parking brake 1, is pressed by brake pad 7 against the facing end face of brake disk 10.

If required, the parking brake may be assisted by a hydraulic vehicle brake, so that the clamping force has an electromotive component and a hydraulic component. In the case of hydraulic assistance, pressurized hydraulic fluid acts on the rear side of brake piston 6 facing the brake motor.

FIG. 2 shows a flow chart including method steps for electrically braking the brake motor upon reaching an end position, thus upon reaching the clamping force position during the brake application process or the release position during the opening process. Method step 20 marks the start of the dynamic motor brake that is configured as an electric motor. The method is divided into a first stage including method steps 21 and 22 and a second stage including method steps 23 through 26 that is to be carried out in parallel. In the first stage of the method, the total time duration of the braking process is monitored. To this end, a first timer, respectively time stamp counter is started in method step 21, and is checked for exceedance of an upper limiting value in subsequent method step 22. For as long as the upper time limiting value has not yet been reached, the query in accordance with method step 22 must be run through again in regular intervals following no-branch ("N"). Upon reaching the upper time limiting value in method step 22, following yes-branch ("Y"), the system advances to method step 27 which marks the end of the braking process.

Method steps 23 through 26 are run through in the second branch of the method in parallel to the testing of the maximum time duration of the braking process in the first branch of the method. In accordance with method step 23, the braking process is initiated by the short-circuiting of the electric brake motor. In next method step 24, the query follows as to whether the motor current falls below a lower limiting value. If this is not yet the case, subsequently to the no-branch, method step 24 is run through again in cyclical intervals, and the query is implemented again. If the motor current falls below the lower current limiting value, subsequently to the yes-branch, the system advances to next method step 25.

In the query in accordance with method step 24, it may be expedient not to advance to next method step 25 until the motor current falls below the lower current limiting value at least twice in succession.

In method step 25, another timer is started that is checked in next method step 26 for exceedance of an assigned limiting value. Thus, it should be ensured that the motor standstill is reliably reached once the current threshold is fallen short of. The time limiting value, for which the second timer in method step 26 is checked, is lower than the time limiting value that holds in the parallel branch of the method in the case of the first timer. Typical characteristic values are 5 ms to 60 ms for the time limiting value in accordance with the second branch of the method and 200 ms for the time limiting value in the first branch of the method.

The time query in accordance with method step 26 is implemented until the second time limiting value is exceeded. Once the time limiting value is reached, the system continues to method step 27. The process of braking the brake motor is thus ended.

FIG. 3 shows another flow chart including method steps for electrically braking the brake motor, the braking period being specified as a constant time period. Method step 30 marks the beginning of the dynamic braking process. In method step 31, the brake motor is short-circuited. In subsequent method step 32, a timer is started that is checked in method step 33 for exceedance of an assigned time limiting value. The time limiting value is 200 ms, for example, and is predefined as a fixed quantity. Method step 33 is run through subsequently to the no-branch until the time limiting value is reached. Subsequently to the yes-branch, the system then advances to method step 34 which marks the end of the brake control.

What is claimed is:

1. A method for adjusting a parking brake in a vehicle that includes an electromechanical braking device having an electric brake motor, the brake motor being adjusted to generate an electromechanical clamping force to a first end position and to release the clamping force to a second end position, the method comprising:

actuating the brake motor to bring the brake motor towards an end position corresponding to one of the first end position and the second end position;

initiating an electrical braking of the brake motor upon reaching the end position, wherein the electrical braking applies a braking torque based on a reduction of a current of the brake motor or a speed of the brake motor, the reduction being sufficient to decelerate the brake motor to a standstill; and controlling a duration of the electrical braking such that the brake motor is braked for a defined braking period.

2. The method according to claim 1, wherein the brake motor is electrically braked by being short-circuited.

3. The method according to claim 1, wherein the duration of the electrical braking is determined by monitoring a motor-related state variable.

4. The method according to claim 3, wherein the motor-related state variable is a motor current, and wherein the brake motor is electrically braked until the motor current falls below a limiting value corresponding to the standstill of the electric motor.

5. The method according to claim 1, wherein the brake motor is electrically braked until a motor speed falls below a limiting value corresponding to the standstill of the electric motor.

6. The method according to claim 1, wherein the defined braking period ends with whichever ends first of:
a defined maximum braking period that begins when the electrical braking is initiated, and
a defined period that begins when a motor current or a motor speed falls below a limiting value corresponding to the standstill of the electric motor.

7. A regulating or control device for carrying out a method for adjusting a parking brake in a vehicle that includes an electromechanical braking device having an electric brake motor, the brake motor being adjusted to generate an electromechanical clamping force to a first end position and to release the clamping force to a second end position, wherein the method comprises:
actuating the brake motor to bring the brake motor towards an end position corresponding to one of the first end position and the second end position;
initiating an electrical braking of the brake motor upon reaching the end position, wherein the braking applies a braking torque based on a reduction of a current of the brake motor or a speed of the brake motor, the reduction being sufficient to decelerate the brake motor to a standstill; and
controlling a duration of the electrical braking such that the brake motor is braked for a defined braking period.

8. The regulating or control device according to claim 7, wherein the brake motor is electrically braked by being short-circuited.

9. The regulating or control device according to claim 7, wherein the duration of the electrical braking is determined by monitoring a motor-related state variable.

10. The regulating or control device according to claim 9, wherein the motor-related state variable is a motor current, and wherein the brake motor is electrically braked until the motor current falls below a limiting value corresponding to the standstill of the electric motor.

11. The regulating or control device according to claim 7, wherein the brake motor is electrically braked until a motor speed falls below a limiting value corresponding to the standstill of the electric motor.

12. The regulating or control device according to claim 7, wherein the defined braking period ends with whichever ends first of:
a defined maximum braking period that begins when the electrical braking is initiated, and
a defined period that begins when a motor current or a motor speed falls below a limiting value corresponding to the standstill of the electric motor.

13. A parking brake in a vehicle having a regulating or control device for carrying out a method for adjusting a parking brake in a vehicle that includes an electromechanical braking device having an electric brake motor, the brake motor being adjusted to generate an electromechanical clamping force to a first end position and to release the clamping force to a second end position, wherein the method comprises:
actuating the brake motor to bring the brake motor towards an end position corresponding to one of the first end position and the second end position; and
initiating an electrical braking of the brake motor upon reaching the end position, wherein the electrical braking applies a braking torque based on a reduction of a current of the brake motor or a speed of the brake motor, the reduction being sufficient to decelerate the brake motor to a standstill; and
controlling a duration of the electrical braking such that the brake motor is braked for a defined braking period.

14. The parking brake according to claim 13, wherein the brake motor is electrically braked by being short-circuited.

15. The parking brake according to claim 13, wherein the duration of the electrical braking is determined by monitoring a motor-related state variable.

16. The parking brake according to claim 15, wherein the motor-related state variable is a motor current, and wherein the brake motor is electrically braked until the motor current falls below a limiting value corresponding to the standstill of the electric motor.

17. The parking brake according to claim 13, wherein the brake motor is electrically braked until a motor speed falls below a limiting value corresponding to the standstill of the electric motor.

18. The parking brake according to claim 13, wherein the defined braking period ends with whichever ends first of:
a defined maximum braking period that begins when the braking is initiated, and
a defined period that begins when a motor current or a motor speed falls below a limiting value corresponding to the standstill of the electric motor.

19. A method for adjusting a parking brake in a vehicle that includes an electromechanical braking device having an electric brake motor, the brake motor being adjusted to generate an electromechanical clamping force to a first end position and to release the clamping force to a second end position, the method comprising:
actuating the brake motor to bring the brake motor towards an end position corresponding to one of the first end position and the second end position; and
initiating a braking of the brake motor upon reaching the end position, wherein the braking applies a braking torque that decelerates the brake motor to a standstill, and wherein the brake motor is electrically braked by being short-circuited.

* * * * *